(No Model.)
F. M. ARCHER.
DRY BATTERY.
No. 548,415. Patented Oct. 22, 1895.
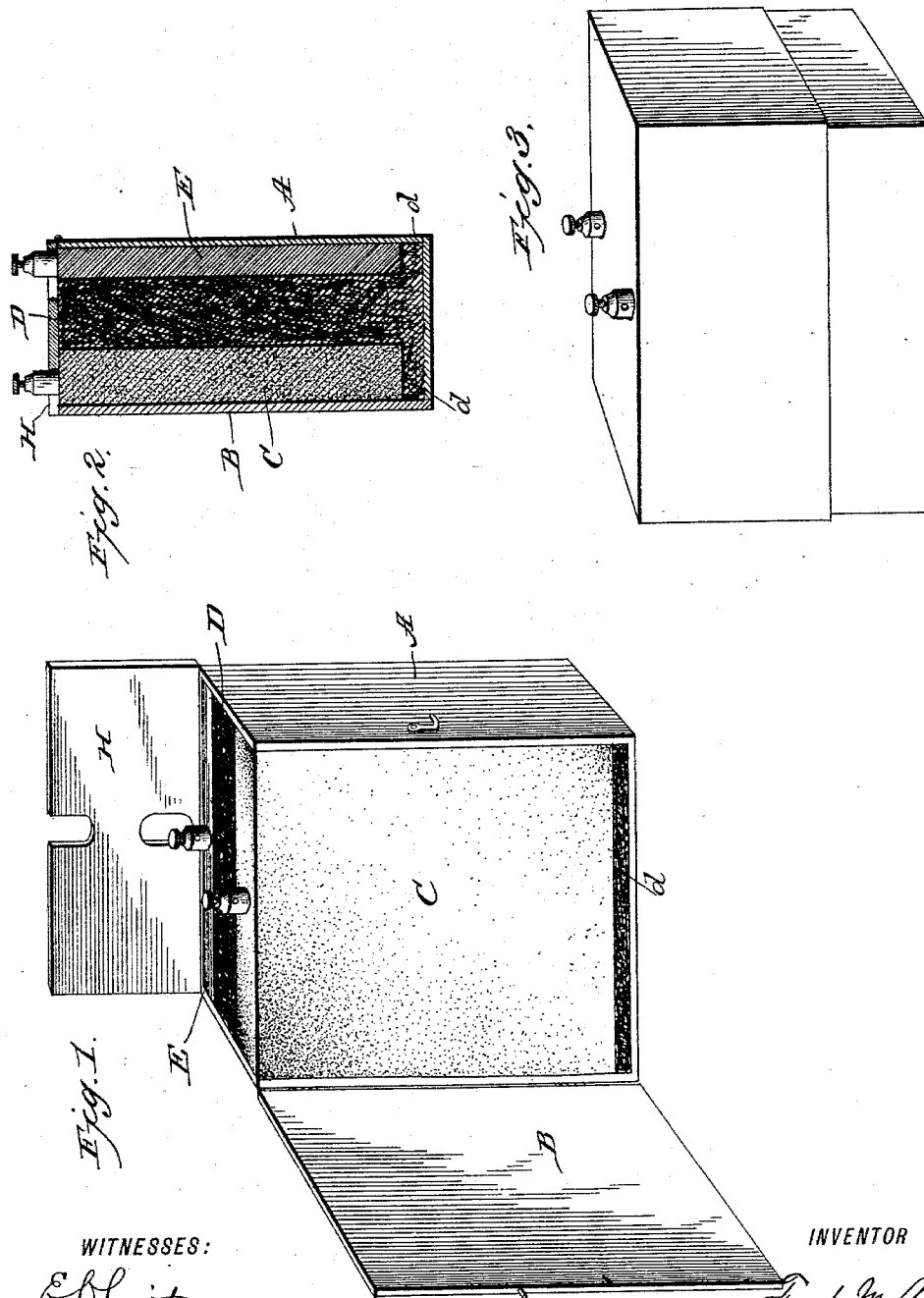
WITNESSES:
E. D. Smith
Alex J. Stewart
INVENTOR
Frank M. Archer
BY Church & Church
HIS ATTORNEYS

UNITED STATES PATENT OFFICE.

FRANK M. ARCHER, OF NEW YORK, N. Y., ASSIGNOR TO SIEGFRIED SILBERBERG, OF SAME PLACE.

DRY BATTERY.

SPECIFICATION forming part of Letters Patent No. 548,415, dated October 22, 1895.

Application filed December 15, 1890. Serial No. 374,813. (No model.)

*To all whom it may concern:*

Be it known that I, FRANK M. ARCHER, of New York, in the county of New York and State of New York, have invented certain new and useful Improvements in Dry Batteries; and I do hereby declare the following to be a full, clear, and exact description of the same, reference being had to the accompanying drawings, forming a part of this specification, and to the letters of reference marked thereon.

My invention relates especially to that class of open-circuit batteries known as "dry batteries;" and it consists in certain novel features hereinafter fully set forth and claimed, the object being to produce a simpler, cheaper, and more effective device of this character than is now in ordinary use and to permit the elements thereof to be renewed whenever desired. Heretofore whenever any one of the elements of such a battery has become consumed, exhausted, or useless by reason of use it has been necessary to give up or rather throw away the entire cell, all of which is therefore lost. In my improved battery, however, whenever any of the elements become exhausted they may be removed and new ones substituted and a battery thereby restored to its full efficiency, as when first made.

In the accompanying drawings, Figure 1 is a side view of a battery embodying my improvement, opening so that the elements may be renewed. Fig. 2 is a vertical section of a cell in a plane passing through the center of the cell at right angles to the elements thereof. Fig. 3 is a perspective view of a modification.

Similar letters of reference in the several figures indicate the same parts.

A represents the containing-case, which is constructed of wood, pasteboard, wood fiber, or any similar or other cheap material, covered on its outer face with a coating of shellac and on its inner face with some suitable acid-proof preparation, although the latter is not essential.

B is one side of the case, which is made either hinged, as shown in Fig. 1, or made movable in grooves in the well-known manner, so that the same can be opened or removable, and thereby give access to the cell.

C is a disk of carbon with a suitable binding-post so attached that its upper portion protrudes through an appropriate opening made in the cover H.

D is a pad, of felt or similar material, which is used to separate the positive and negative elements of the cell and at the same time to serve as an absorbent vehicle of the battery fluid. This pad is provided at its bottom with flanges or lugs $d$ of the same material extending outward to the sides of the cells and upon which flanges the positive and negative elements of the cell respectively rest, thereby being separated from the bottom of the cell C.

E is a plate or disk of zinc or other positive element furnished with a binding-post, the upper portion of which protrudes through the cover H of the cell in convenient proximity to the binding-post of the negative element C.

H is a cover made removable or hinged and furnished with appropriate openings for the protrudes of the binding-posts of the positive and negative elements, respectively.

The pad D is soaked in or saturated with a solution of sulphuric acid or other excitant. If this excitant should become exhausted, the inclosing case can easily be opened and the battery recharged by remoistening the pad with a fresh charge of the exciting-fluid.

In another application for Letters Patent, Serial No. 374,814, filed December 15, 1890, I have described a method of treating carbons by dipping the same in sulphuric acid or other excitant, whereby the first efficiency thereof is greatly increased, and whereby said efficiency is fully restored after said carbons have been rendered temporarily inert by use. In the use of batteries herein described, when the same have become inert by reason of use it is not necessary to throw away the cell, but the same can be opened, the carbon withdrawn, and the carbon can be restored to its full efficiency by dipping the same in acid, as described in my said application, or a new carbon either dipped or plain undipped can be substituted. The old carbon so removed can be retained and afterward dipped, as described in said application, and either put into new batteries or substituted for other carbons that may be withdrawn, as herein described. In like manner if the zinc is exhausted the cell may be opened, as herein described, and a new zinc substituted, and the same is true of the felt pad, which may be either renewed or redipped in the excitant fluid, as aforesaid. In this way the life of the cell is very greatly extended and the whole rendered much cheaper and more convenient.

It is obvious that the battery-case may be made separable in other well-known ways—for instance, two half-cases may be employed, which telescope together, as shown in Fig. 3.

Having thus described my invention, what I claim as new is—

1. In a dry electric battery a containing case which can be opened in combination with an absorbent pad separating the positive and negative elements of said battery which said pad is provided with lugs upon which the said elements rest respectively; substantially as described.

2. In a dry battery, the combination with the inclosing case having the removable side and top sections, and a positive element, a porous negative element, and a removable absorbent pad separating said elements.

FRANK M. ARCHER.

Witnesses:
OSCAR H. CACCIOLA,
W. J. MEAGHER.